United States Patent Office 2,841,336
Patented July 1, 1958

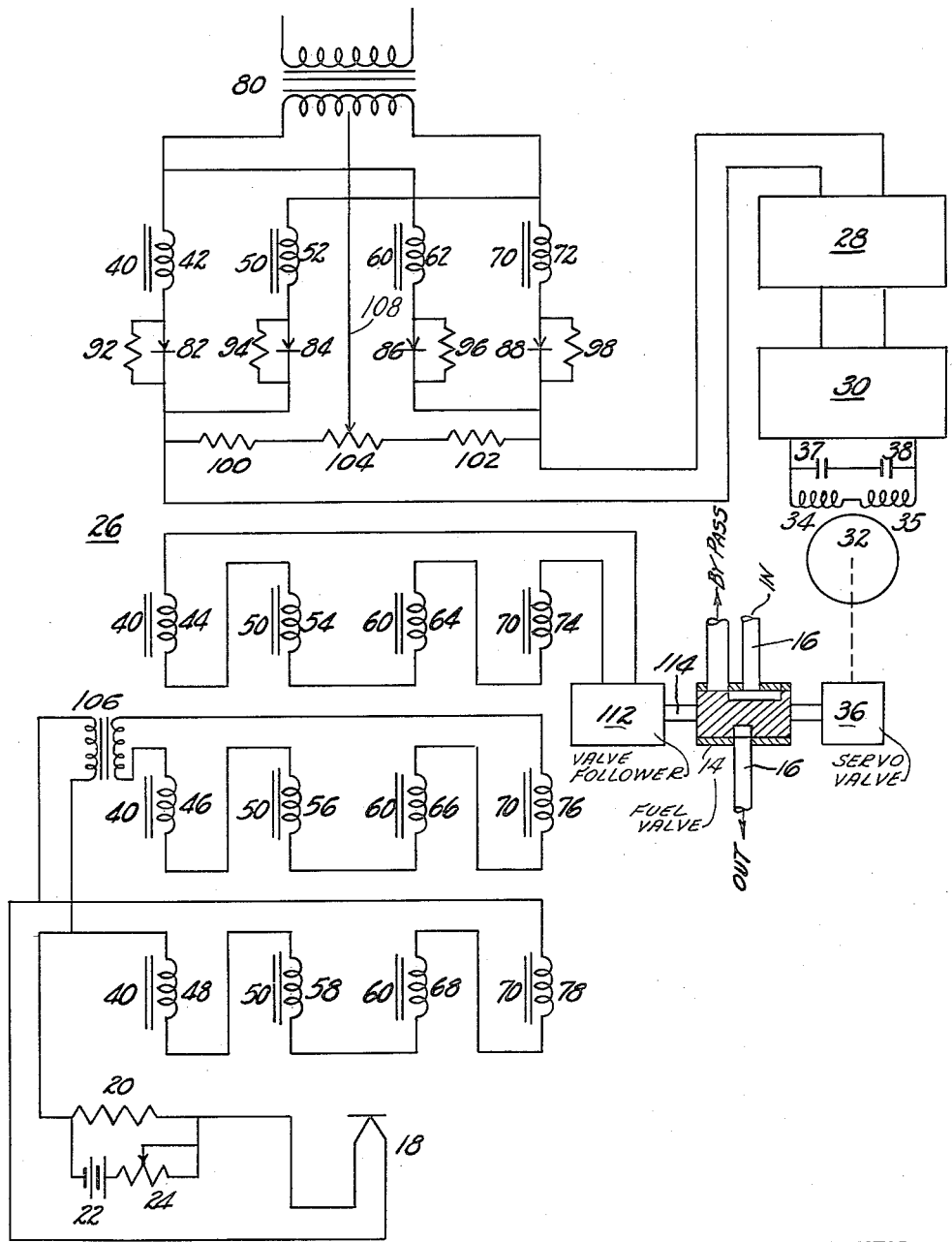

2,841,336
ELECTRO-MAGNETIC CONTROL DEVICE

Lyle Martin, South Bend, Ind., assignor to Bendix Aviation Corporation, South Bend, Ind., a corporation of Delaware Application July 9, 1953, Serial No. 367,045

6 Claims. (Cl. 236—78)

This invention relates to control systems and more particularly to systems using magnetic amplifiers.

There are many applications in which a high degree of accuracy must be combined with sufficient durability to insure that the system will operate at peak of efficiency under adverse conditions of vibration and temperature. Such conditions are often encountered in systems requiring the maintenance of very close tolerances in operating temperatures, such as those found in furnaces, gas turbine engines and the like. It is to be understood, however, that although the device of the invention is shown in connection with such a system, this is only by way of example, and that the invention may be used wherever applicable.

It is one of the objects of the invention to provide an electromagnetic control system which is highly reliable, yet capable of holding magnitudes of the quantity sensed within very close limits.

It is another object of the invention to provide a control device which acts very rapidly to correct undesired variations in the quantity sensed.

It is a further object to provide a system which will accomplish the above objects with apparatus of limited size and weight.

Other objects and advantages will occur to those skilled in the art from the following description and the accompanying drawing.

With reference to the drawing, numeral 14 indicates a fuel valve which controls the flow of fuel through a main fuel conduit 16. A temperature sensing element or thermocouple 18 creates a small electrical signal proportional to the temperature to which it is exposed. In bucking relationship with this signal is a temperature reference signal applied across resistor 20. This signal is supplied from voltage source 22 and may be varied by means of potentiometer 24. The resultant of these two signals is applied to the input of a magnetic amplifier which is shown as having three stages 26, 28 and 30. In the amplifier, the signal is amplified sufficiently to operate a torque motor 32 by inducing a greater current in either winding 34 or winding 35 depending upon the desired direction of rotation of the motor. This motor then moves servo valve 36 which in turn operates valve 14 in either an opening or a closing direction, thus regulating the flow of fuel through conduit 16.

Referring more specifically to the magnetic amplifier, the temperature error signal is amplified through three stages of which only the first stage 26 is shown in detail. Stages 28 and 30 which are indicated in block form, are essentially the same as stage 26 except in the case of output stage 30 which develops its signal across the windings of the torque motor 32 rather than across resistors. Because of the high inductance loading throughout the system, condensers 37 and 38 have been inserted as shown in the output stage to correct the power factor.

Stage 26 contains four iron cores with one alternating current and three direct current windings on each core. In the drawing, all coils in a vertical line are wound on the same core; e. g. upon core 40 are wound coils 42, 44, 46 and 48; upon core 50, coils 52, 54, 56 and 58; upon core 60, coils 62, 64, 66 and 68; and upon core 70, coils 72, 74, 76 and 78. Coils 42, 52, 62 and 72 are supplied with alternating current from the secondary winding of power transformer 80. In series with each of said alternating current coils are rectifiers 82, 84, 86 and 88, respectively. Shunting said rectifiers are resistors 92, 94, 96 and 98, respectively. The output from stage 26 is developed across resistors 100 and 102 and potentiometer 104. Windings 48, 58, 68 and 78 are control windings upon which the direct current temperature error signal is impressed. Transformer 106 and windings 46, 56, 66 and 76 comprise a rate or anticipation circuit which serves to improve the stability of the system. The temperature rate signal is a direct current voltage the effect of which is to modify the temperature error signal. Further modification of the output signal is provided by windings 44, 54, 64 and 74 which provide to the amplifier a signal proportional to the velocity of fuel valve 14.

Operation of the amplifier may perhaps be best understood by an examination of a single core and its associated components. A closed circuit is formed by the left branch of the secondary of transformer 80, coil 42, rectifier 82 with shunt resistor 92, resistor 100, the left side of potentiometer 104 and wire 108 which connects the potentiometer with the center tap on the secondary of transformer 80. This much of the circuit, plus a control winding 48, which is wound on core 40 forms a basic magnetic amplifier. Because of the action of rectifier 82, it will be assumed at this point that the current through the coil 42 is a pulsating direct current and that, as a consequence, the lines of flux in core 40 do not reverse themselves but maintain core 40 at or near saturation. The addition of a small direct current signal of opposite polarity on winding 48 drives the core out of saturation, thereby greatly increasing the impedance through coil 42 and decreasing its current flow. It is apparent that the small direct current signal on control winding 48 which produces a large increase in the voltage drop across coil 42, produces a corresponding decrease in voltage drop across resistor 100 and the left portion of potentiometer 104 which is of much greater magnitude than the control signal voltage.

Because it responds to changes in a very small thermocouple voltage, the present control system relies heavily upon the maintenance of a stable amplification system. The dry disc type rectifiers used, however, are subject to increased back leakage from temperature and aging effects which would tend to render the system unstable unless some provision were made to compensate therefor. Shunt resistor 92 provides this compensation and also provides a simple and easily adjustable method of negative feed-back. In this magnetic amplifier circuit, as in any amplifier, negative feed-back results in a loss in overall gain and an increase in stability.

The feed-back is effected by the shunt resistor-rectifier combination. The value of the resistor together with the value of the reverse resistance of the rectifier determines the degree of negative feed-back. The selection of a value for resistor 92 is therefore a compromise between the degree of temperature stability desired on the one hand and the loss of overall gain due to negative feed-back on the other. A smaller shunting resistor reduces gain but improves stability. The shunting resistor may be made adjustable so that a means of gain adjustment is available.

In the overall amplifier system, a further guarantee of stability is made by arranging four such basic amplifiers in an inverse-parallel, full-wave system. To simplify the discussion, it will now be assumed that the reverse current flowing through the rectifiers and shunt resistors is negligible. Assume a given instant in which the left end of the secondary of power transformer 80 is positive. Current will then flow through coil 42, rectifier 82, and resistor 100 and the left branch of potentiometer 104. At the same time current flows through coil 62, rectifier 86, resistor 102, and the right branch of potentiometer 104. It will be seen that these voltages are opposing, and inasmuch as the impedance values in each branch are the same, there will be a complete cancellation of the signal unless something is done to disturb these impedance values. In the following half cycle, current flows from the right branch of the secondary of transformer 80 through coil 72, rectifier 88, resistor 102 and the right side of potentiometer 104, and is opposed by a current flowing through coil 52, rectifier 84, resistor 100, and the left branch of potentiometer 104. The end result is zero signal appearing at the output. This arrangement actually is a bridge which is balanced under conditions of no control winding signal by means of potentiometer 104.

As indicated previously, a flow of current in control winding 48 of polarity tending to unsaturate core 40 causes an increase in the impedance of coil 42. The small direct current temperature error signal flows through coils 48, 58, 68 and 78 which are in series. Under the conditions existing when the left end of the transformer 80 is positive, no significant current flows through coils 52 and 72 because of the rectifier action. Therefore the only coils which are, at that instant, receptive to the control signal are coils 42 and 62. However, control windings 48 and 68 are wound to cause lines of flux to flow in opposite directions in their respective cores. The effect of a current flowing downward through coil 68 under the assumed conditions through the control windings will be to cause core 60 to saturate, reducing the impedance of coil 62 while the current upward through coil 48 results in unsaturation and, hence, a greater voltage drop across coil 42. Under the unbalanced conditions caused by these changes in impedance, the voltage drop across resistor 102 and the right branch of potentiometer 104 becomes greater than the drop across resistor 100 and the left branch of resistor 104, thus creating an output voltage. With control voltage in the same direction as before, assume the power supply voltage one-half cycle later. Current flows only through coils 52 and 72. The control signal on coil 78 will saturate core 70, but because of the direction in which coil 58 is wound, will have a demagnetizing effect on core 50. Saturation of core 70 causes a reduction in the impedance of coil 72, while the demagnetizing effect on core 50 increases the impedance of coil 52 resulting in an increased voltage drop across resistor 102 and the right branch of potentiometer 104. It will be apparent that the resulting voltage drop across the output stage is in the same direction as before. A change in polarity of the temperature error signal, assuming again that the left end of the secondary of transformer 80 is positive, will cause current to flow downward through coil 48, saturating core 40 while the current flowing upward through coil 68 tends to demagnetize core 60. Current flowing through coils 58 and 78 has no effect because of rectifier action. Unsaturation of core 60 causes an increase in the impedance of coil 62 resulting in a decreased voltage drop across resistor 102 and the right branch of potentiometer 104. At the same time there occurs a corresponding decrease in voltage drop through coil 42 which results in a greater voltage drop across resistor 100 and the left branch of potentiometer 104. This results in an output signal of polarity opposite to that in the example above. With the power supply voltage 180° later, it will be core 70 which becomes unsaturated, again resulting in a greater voltage drop across resistor 100 and the left branch of potentiometer 104. Hence the polarity of the output of stage 26 is dependent entirely on the polarity of the temperature error signal. This output is supplied to stage 28 and is amplified in the manner described. Further amplification takes place in stage of 30 which develops the greater part of its output across either coil 34 or coil 35 depending on which direction it is desired to rotate torque motor 32 to alter the position of servo valve 36 and hence, fuel valve 14.

Direct current control windings 46, 56, 66 and 76 operate in a manner identical with windings 48, 58, 68 and 78, but act to modify the saturation effects of the main control windings in order to provide system stability. Transformer 106 is connected directly across the thermocouple voltage, and while it is not responsive to a steady direct current signal, it is responsive to changes in the signal which occur as a result of temperature changes sensed by thermocouple 18. A varying direct current signal induces a voltage in the secondary of transformer 106 which causes current to flow in the windings 46, 56, 66 and 76. This current flows until the thermocouple signal is no longer varying.

As an additional measure to keep the entire system from oscillating around the point of optimum fuel flow, direct current windings 44, 54, 64 and 74 are provided on cores 40, 50, 60 and 70, respectively. The signal for these windings is supplied from a valve follower mechanism 112, which may be of many possible known designs, such as a conventional resistance-capacitance rate circuit. As corrections are made in the position of valve 14, shaft 114 moves back and forth. Movement to the left results in the creation, within the valve follower mechanism 112, of a current in a certain direction through windings 44, 54, 64 and 74. Movement to the right causes current to flow in the opposite direction. The magnitude of current flow is established by the velocity of the valve 14, and is, in either case, of such direction as to prevent excessive translation of the valve.

Operation of the system is as follows: Assuming a condition when the thermocouple voltage is exactly equalled by the reference voltage, no signal will flow through either control windings 48, 58, 68 and 78 or through rate windings 46, 56, 66 and 76. There being no signal to alter the impedance of any of the windings, the currents flowing through coils 42, 52, 62 and 72 will balance each other and no output signal will be available for stages 28 or 30, no unbalance current will flow through torque motor windings 34 or 35, there will be no motor rotation and hence, no change in the position of servo valve 36 or fuel valve 14.

Should an over temperature condition occur, the signal from the thermocouple will overcome the bucking temperature reference signal across resistor 20 and current will flow through windings 48, 58, 68 and 78. For purposes of illustration we shall assume that this current is in such direction as to flow downward through windings 48 and 58 and upward through windings 68 and 78. Irrespective of the instantaneous polarity of the secondary of transformer 80, a voltage will be induced across resistor 100 and the left branch of potentiometer 104 which is greater than that across resistor 102 and the right branch of potentiometer 104, resulting in an output voltage which is impressed upon the input of stage 26. This signal is further amplified in stages 28 and 30 and appears on winding 34, thus providing excitation causing torque motor 32 to exert a force on servo valve 36. This force is sufficient to move servo valve 36 in a direction tending to close valve 14. The movement of valve 14 causes a linear movement of shaft 114 thereby causing a flow of current from valve follower mechanism 112 to windings 44, 54, 64 and 74 in such direction as to reduce the signal voltage.

An under-temperature error (following the original assumption of polarity) is reflected in a flow downward through windings 78 and 68, and upward through windings 58 and 48. The result of this current flow is the amplification through stages 26, 28 and 30 of a signal of opposite polarity to that in the example above. Exciting winding 35 receives the signal causing torque motor 32 to exert a force causing servo valve 36 to move fuel valve 14 in an opening direction. Through the resulting translation of shaft 114, a current is caused to flow in windings 44, 54, 64 and 74 of such polarity as to oppose further movement of valve 14.

Temperature rate transformer 106 and windings 46, 56, 66 and 76 operate to add algebraically a rate of temperature change signal to the temperature error signal on windings 48, 58, 68 and 78. Thus as the operating temperature approaches the reference value, the rate transformer senses a rate of change, impressing this rate current in such direction and of such magnitude as to compensate for the lag inherent in the thermocouple. Because of the inertia present in the system, this compensation prevents overshooting of the reference point. Conversely, should a large temperature error signal develop suddenly, the rate transformer would sense a large rate of change which is added to the error signal to give a momentary indication of an even greater temperature error than actually exists. In this manner the rate circuit insures that error corrections are made very rapidly.

Although this invention has been described in connection with temperature sensing applications, those skilled in the art will realize that adaptation to other applications would require no more than minor modifications. The device of the invention is obviously capable of regulating many quantities the magnitude of which can be reflected by a small direct current signal. Some applications might require a two-phase motor capable of creating a significant shaft rotation rather than a torque motor. And while the valve is shown as moving linearly, it would be within the scope of the invention to utilize a rotating valve.

Having thus described the various features of the invention, what I claim as new and desire to secure by Letters Patent is:

1. In a system for controlling fuel flow according to temperature, a main fuel conduit, a fuel valve in said conduit, servo means for operating said fuel valve, a torque motor for actuating said servo means, a thermocouple for sensing said temperature and for creating an electrical signal proportional in magnitude to said temperature, means for creating a reference against which said electrical signal is compared; a magnetic amplifier for amplifying the signal resulting from said comparison, said amplifier consisting of a plurality of stages each of which contains four basic magnetic amplifiers arranged in an inverse-parallel, full-wave system, and each of said basic amplifiers being supplied with a source of alternating current and containing a core of magnetic material, a power winding around said core which is connected to said alternating current source, a plurality of control windings around said core, a rectifier in series with said power winding, a resistance associated with said rectifier in such manner as to provide negative feedback, and means for balancing the outputs of said four basic amplifiers in such manner as to cause no voltage to be developed across the output of the stage unless a current is flowing in one of said direct current control windings.

2. In a system for controlling fuel flow according to temperature, a main fuel conduit, a fuel valve in said conduit, servo means for operating said fuel valve, a torque motor for actuating said servo means, means for creating an electrical signal proportional in magnitude to a sensed temperature, means for creating a reference signal against which said electrical signal is compared; a magnetic amplifier for amplifying the temperature error signal resulting from said comparison, said amplifier consisting of a plurality of stages each of which contains four basic magnetic amplifiers arranged in an inverse-parallel, full-wave system, and each of said basic amplifiers being supplied with a source of alternating current and containing a core of magnetic material, a power winding around said core which is connected to said alternating current source, a control winding around said core upon which said temperature error signal is impressed, a direct current rate winding around said core upon which signals responsive to rate of change of temperature are impressed, a direct current valve rate winding around said core upon which signals responsive to valve positional changes are impressed, a rectifier in series with said power windings, a resistance associated with said rectifier in such manner as to provide negative feedback, and all but the output stages containing a second resistance in series with said power winding, means for balancing the outputs of said basic amplifiers in such manner as to cause no voltage to be developed across the output of a stage unless a current is flowing in one of said direct current windings; and the output stage developing its signal across the windings of said torque motor.

3. A system for controlling temperatures comprising a main fuel conduit, a fuel valve in said conduit, electrical means for actuating said fuel valve, means responsive to movement of said valve for producing a valve rate signal, a thermocouple for creating an electrical signal proportional to actual instantaneous temperature values, means for developing a reference signal in opposition to said thermocouple signal, a multi-stage magnetic amplifier for amplifying the resultant of said thermocouple and reference signals and thereby actuating said electrical means, each stage of said amplifier containing a source of alternating current, a plurality of cores of magnetic material, power windings around said cores connected to said source in an inverse-parallel, full-wave arrangement, a series of direct current control windings on said cores upon which said resultant signal is impressed, a transformer with its primary winding across the input to said direct current windings, and with its secondary winding forming the input to a second series of control windings on said cores, and a third set of control windings on said cores connected to said valve rate signal producing means, said circuit being arranged in such manner that movement of the fuel valve causes current to flow in said third set of control windings.

4. In a system for controlling fuel flow according to temperature, a main fuel conduit, a fuel valve in said conduit, servo means for operating said fuel valve, a torque motor for actuating said servo means, a thermocouple for sensing said temperature and for creating an electrical signal proportional in magnitude to said temperature, means for creating a reference against which said electrical signal is compared; a magnetic amplifier for amplifying the temperature error signal resulting from said comparison, said amplifier consisting of a plurality of stages each of which contains four basic magnetic amplifiers arranged in an inverse-parallel, full-wave system, and each of said basic amplifiers being supplied with a source of alternating current and containing a core of magnetic material, a power winding around said core which is connected to said alternating current source, a control winding around said core upon which said temperature error signal is impressed, a direct current temperature rate winding around said core upon which signals responsive to rate of change of temperature are impressed, a direct current valve rate winding around said core upon which signals responsive to valve positional changes are impressed, a rectifier in series with said power winding, a resistance in parallel with said rectifier, and all but the output stage containing a second resistance in series with said power winding, a potentiometer arranged to balance the outputs of said basic amplifiers in such manner as to cause no voltage to be developed across the output of the stage unless a current is flowing in one of said direct current windings; and the output stage developing its signal across the windings of said torque motor.

5. In combination, means for creating a direct current signal proportional in magnitude to a quantity sensed, means for creating a reference signal against which said direct current signal is compared; a magnetic amplifier for amplifying the resultant of said signals comprising a plurality of stages each of which contains a plurality of cores of magnetic material, power windings inductively related to each of said cores and arranged in an inverse parallel, full-wave system, a direct current signal winding inductively related to each of said cores, a rectifier in series with each of said power windings, a resistance associated with said rectifier in such manner as to provide negative feedback, a resistance in series relationship with each of said rectifiers, and a variable resistance so arranged that no signal will be developed across the output of a stage unless a current is flowing in said direct current control windings; an electric machine for using said amplified resultant signal to create a shaft rotation, and means responsive to said shaft rotation for varying a controlling quantity in such direction as to reduce said resultant signal.

6. In combination, means for creating a direct current signal proportional in magnitude to a quantity sensed, means for creating a reference signal against which said direct current signal is compared, electromagnetic means for amplifying the resultant of said signals; said electro-magnetic means comprising a plurality of stages each of which contain a plurality of cores of magnetic material, power windings inductively related to each of said cores and arranged in an inverse-parallel system, a direct current signal winding inductively related to each of said cores, a rectifier in series with each of said power windings, resistance means in series relationship with said rectifiers so arranged that no signal will be developed across the output of this stage unless a current is flowing in said direct current control windings; an electric machine for using said amplified resultant signal to create a shaft rotation, and means responsive to said shaft rotation for varying a controlling quantity in such direction as to reduce resultant signal, and means responsive to the movement of said last named means for producing a feedback signal for said amplifier.

References Cited in the file of this patent
UNITED STATES PATENTS

| | | |
|---|---|---|
| 2,126,790 | Logan | Aug. 16, 1938 |
| 2,629,984 | Jamison | Mar. 3, 1953 |
| 2,644,127 | Bradley | June 30, 1953 |
| 2,688,724 | Newell | Sept. 7, 1954 |
| 2,689,455 | Stockinger | Sept. 21, 1954 |
| 2,697,908 | Offner | Dec. 28, 1954 |

OTHER REFERENCES

Ogle: "The Amplistat and its Application," part III, pages 41–46, inclusive, of the General Electric Review for October 1950.